United States Patent [19]

Dollhausen et al.

[11] 3,935,135

[45] Jan. 27, 1976

[54] HEAT-SEALING ADHESIVES

[75] Inventors: Manfred Dollhausen, Odenthal; Gerhard Hohmann, Leverkusen, both of Germany

[73] Assignee: Bayer Aktiengesellschaft, Germany

[22] Filed: Apr. 19, 1974

[21] Appl. No.: 462,309

[30] Foreign Application Priority Data

Apr. 25, 1975    Germany............................ 2320804

[52] U.S. Cl.............. 260/3.5; 156/333; 260/30.8 R; 260/31.2 R; 260/31.2 MR; 260/32.8 A; 260/33.4 PQ; 260/33.6 A; 260/33.6 PQ; 260/33.8 UA; 260/845; 260/847; 260/889; 260/890; 260/897 C; 428/463
[51] Int. Cl.²....................... C08L 15/02; C08L 7/00
[58] Field of Search........ 260/3.5, 889, 890, 30.8 R, 260/897 C; 156/333

[56] References Cited
UNITED STATES PATENTS

| | | | |
|---|---|---|---|
| 2,490,536 | 12/1949 | Murphy et al. | 260/3.5 |
| 2,776,914 | 1/1957 | Faulwetter | 260/3.5 |
| 3,053,712 | 11/1962 | Grabowski | 156/333 |
| 3,258,389 | 6/1966 | Coleman et al. | 156/333 |
| 3,351,677 | 11/1967 | Barton et al. | 260/889 |
| 3,542,704 | 11/1970 | Radcliffe et al. | 260/30.8 R |

*Primary Examiner*—John C. Bleutge
*Attorney, Agent, or Firm*—Connolly and Hutz

[57] ABSTRACT

Adhesive consisting substantially of a modified olefine polymer, a chlorinated olefine or diene polymer, an alkylated polyphenyl sulphone, an aromatic polynitroso compound and an organic solvent or solvent mixture.

5 Claims, No Drawings

HEAT-SEALING ADHESIVES

This invention relates to heat-sealing adhesives having a high heat resistance obtained from a modified olefine polymer, a chlorinated olefine or diene polymer, an alkylated polyphenyl sulphone, an aromatic polynitroso compound and an organic solvent.

It is known to produce solvent-containing adhesives from ethylene-vinyl ester copolymers. The use of ethylene-vinyl acetate copolymers for preparing solvent-containing adhesives for glueing polyethylene to textiles and paper, and also to less flexible materials such as metal, wood or stone has been described in U.S. Pat. No. 2,543,229. According to German Patent Specification No. 1,071,953, solvent-containing adhesives obtained from ethylene-vinyl acetate copolymers may also be used for bonding glass to safety glass. German Auslegeschrift No. 1,295,123 also describes the use of solvent-containing adhesives for bonding together wood to polyurethane foams.

One serious disadvantage of bonds produced with these known adhesives is their low strength, which especially at elevated temperatures is quite insufficient to satisfy many of the requirements in practice, for example in the case of metal/rubber and metal/plastics bonds used in the motorcar industry.

It is an object of this invention to provide solvent-containing adhesives with which it is possible to obtain heat-resistant bonds which have excellent strength and high resistance to organic solvents, oils, fats and other external conditions.

The problem was solved by preparing adhesives from a modified olefine polymer, a chlorinated olefine or diene polymer, an alkylated polyphenyl sulphone, an aromatic polynitroso compound and an organic solvent or solvent mixture.

This invention therefore relates to an adhesive consisting substantially of (a) a modified olefin polymer, (b) a chlorinated olefine or diene polymer, (c) an alkylated polyphenyl sulphone, (d) an aromatic polynitroso compound and (e) an organic solvent or solvent mixture.

The modified olefine polymer (a) used for preparing the adhesives according to the invention may be, for example, an ethylene-vinyl ester copolymer of the kind which can obtained by known polymerisation methods from ethylene and vinyl esters of organic acids which contain 2 to 10 carbon atoms. The following vinyl esters may be used: vinyl esters of acetic acid propionic acid, butyric acid, caproic acid, caprylic acid and capric acid. Vinyl acetate is preferred. Particularly advantageous results are obtained when using ethylene-vinyl acetate copolymers of the kind described in German Offenlegungsschrift No. 1,495,660 = U.S. Pat. No. 2,947,735, particularly polymers which have a vinyl acetate content of 35 to 70 % by weight, preferably 40 to 50 % by weight and among these again it is preferred to use those with a melt index of 1 to 100, preferably 2 to 15, determined according to ASTM d 1238, condition E.

The modified olefine polymers used for preparing the adhesives according to the invention may also be chlorosulphonation products of polyisobutylene which can be prepared by known methods, particularly the chlorosulphonation product of polyethylene. Chlorosulphonated olefines have chlorine contents of 20 to 60 % by weight, preferably 25 to 50 % by weight, and sulphur contents of 0.2 to 2.0 % by weight, preferably 0.5 to 1.5 % by weight.

The modified olefine polymers used are preferably ethylene vinyl acetate copolymers.

The chlorinated olefine or diene polymers (b) used may be chlorination products of polyethylene or polypropylene which can be prepared by known methods, particularly the chlorination products of natural rubber and especially of polyisoprene. The said chlorination products have chlorine contents of 60 to 70 % by weight and a viscosity of about 40 to 250 Poises, determined on 20 % by weight solutions in toluene at 20°C, using a Brookfield-LVF viscosimeter (spindle 1, 30 revs, per min). Chlorinated polyisoprene is preferred.

Alkylated polyphenyl sulphones (c) used according to the invention have the general formula

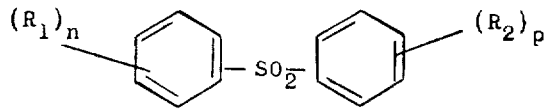

in which $R_1$ and $R_2$ represent each an alkyl-, with 1 to 10 carbon atoms, an alkoxy-, with 1 to 10 carbon atoms, a cycloalkyl-, with 5 to 12 carbon atoms, a phenyl-, a phenylalkyl-, with 7 to 13 carbon atoms, a phenoxy- or phenylalkoxy group with 6 to 12 carbon atoms, $n$ denotes 0 or an integer of from 1 to 5 and
$p$ denotes an integer of from 1 to 5.

In the general formula $R_1$ and $R_2$ preferably denote an alkyl group containing 1 – 4 carbon atoms, in particular methyl and $n$ is preferably 0 – 2 and $p$ 1 or 2. 4,4'-Dimethyl-diphenyl sulphone, 2,4,4'-trimethyl-diphenyl sulphone and their mixtures are particularly suitable.

Alkylated polyphenyl sulphones can be prepared by known methods (U.S. Patent 2,224,964).

The organic polynitroso compounds used may be compounds of the following general formula which can be prepared by known methods (see J. Org. Chem. 25, 1071 (1960)):

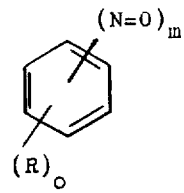

in which formula R denotes an alkyl-, with 1 to 10 carbon atoms, an alkoxy-, with 1 to 10 carbon atoms, an alkanolamine-, with 1 to 10 carbon atoms, a cycloalkyl-, with 5 to 12 carbon atoms, a phenylalkyl-, with 7 to 13 carbon atoms, a phenyl-, a phenoxy-, a phenylamine- or phenyl nitrosoamine group or halogen, $o$ represents a figure of from 0 to 5 and $m$ represents 1 or 2. p-dinitrosobenzene is preferred.

The following are given as examples of suitable solvents (e): aromatic hydrocarbons such as toluene, xylene and benzene; chlorinated hydrocarbons such as methylene chloride, trichloroethylene and perchloroethylene; ketones such as acetone, methyl ethyl ketone and methyl isobutyl ketone; carboxylic acid esters such as methyl acetate, ethyl acetate and butyl acetate; alcohols such as methanol, ethanol and butanol; or mixtures of the above mentioned solvents. Aromatic hydrocarbons such as xylene, toluene and benzene and/or aliphatic hydrocarbons such as trichloroethylene or perchloroethylene are preferred.

Particularly preferred combinations of components (a) to (e) are shown in table 1.

The adhesives according to the invention preferably have the following percentage composition: 0.5 - 30 % by weight, particularly 2 - 10 % by weight of component a; 0.5 - 30 % by weight, particularly 2 - 15 % by weight of component b; 0.5 - 30 % by weight, particularly 2 - 15 % by weight of component c; 0.1 - 24 % by weight, particularly 1 - 8 % by weight of component d and 30 - 90 % by weight, particularly 60 - 85 % by weight of component e.

Other substances may also be added to the adhesives according to the invention to achieve special effects, e.g. natural or synthetic resins, for example phenol formaldehyde resins such as novolaks or resols, fillers such as silicates and/or carbon black, dyes and/or pigments.

According to a preferred embodiment by which optimum strength and resistance of the bonds is achieved, the adhesives according to the invention may be used in combination with primer solutions which ensure the strongest possible adherence to metal.

The primer solution used is preferably a solution of a low-molecular weight phenol formaldehyde resin (resol type) with one of the olefine or diene polymers mentioned under (b) in one of the solvents or solvent mixtures mentioned under (e), in particular dialkyl ketones such as methyl isobutyl ketone.

The low-molecular weight phenol formaldehyde resin (resol type) used may be an alkaline-condensed resin with a molar ratio of phenol to formaldehyde of between 1:0.5 and 1.5 and a viscosity of 1500 to 10 000 cP, determined on a 60 % by weight solution in butanol at 20°C with a Brookfield LVF viscosimeter.

The primer solution consists of 5 to 40 % by weight, preferably 5 to 15 % by weight of phenol formaldehyde resin (resol type), 5 to 40 % by weight, preferably 5 to 15 % by weight of one of the chlorinated olefine or diene polymers mentioned under (b), in particular chlorinated polyisoprene, and 30 to 90 % by weight, preferably 70 to 90 % by weight of one of the solvents mentioned under (e), in particular methyl isobutyl ketone.

To prepare the adhesives and primers according to the invention, the components are dissolved or suspended together in one of the above mentioned solvents or solvent mixtures in the proportions indicated above at temperatures of 10 to 40°C, preferably room temperature. Temperatures above or below this range may, of course, also be employed.

Application of the adhesive according to the invention and of the primer to the materials which are to be bonded may be carried out by the usual methods, for example of immersion, brush-coating or spraying.

To produce the bonds, the adhesives according to the invention are applied as thin layers to the metal and vulcanisate surfaces which are to be bonded.

Before the adhesives are applied, the surfaces of the metals are preferably sand-blasted and degreased with trichloroethylene and the surfaces of vulcanisates are cleaned with trichloroethylene. Metals and vulcanisates coated with the adhesives according to the invention are placed together with their layers of adhesive in contact after the solvent has evaporated off, and they are then heated while in contact to elevated temperatures, preferably between 100° and 200°C, for up to one hour or more. During the heating process, the bonds are fixed by application of pressure which ensures intimate contact between the two layers of adhesive.

The composite materials produced in this way, which are distinguished by their high strength and high resistance to organic solvents, oils and fats, have a wide range of possible applications, for example in the motorcar industry for producing safety elements in motor vehicles.

The adhesives according to the invention serve to bond materials such as plastics, metals, porcelain or rubber and are preferably used for bonding metals to rubber vulcanisates such as vulcanisates of natural rubber, nitrile rubber, butyl rubber or styrene-butadiene rubber and particularly natural rubber.

The percentages given in the following examples refer to weight unless otherwise indicated.

Table 1

| Examples Adhesive | A | B | |
|---|---|---|---|
| Ethylene-vinyl acetate copolymer 1) | 4 | | parts by weight |
| chlorosulphonated polyethylene 2) | | 4 | parts by weight |
| chlorinated polyisoprene 3) | 8 | 8 | parts by weight |
| alkylated diphenyl sulphone 4) | 8 | 8 | parts by weight |
| Carbon black 5 | 2 | 2 | parts by weight |
| p-dinitrosobenzene | 4 | 4 | parts by weight |
| xylene | 55 | 55 | parts by weight |
| perchloroethylene | 15 | 15 | parts by weight |

1) with a vinyl acetate content of 45% and a melt index of 2 to 5 determined according to ASTM D 1238, condition E
2) with a chlorine content of 42% and a sulphur content of 1.1%
3) with a chlorine content of 67% and a viscosity of 160 cP, determined on a 20% solution in toluene at 20°C using a Brookfield LVF viscosimeter (spindle 1, 30 revs. per min)
4) mixture of 4,4'-dimethyl- and 2,4,4'-trimethyl-diphenyl sulphone with a viscosity of 550 Poises, determined at 20°C with a Brookfield RVT viscosimeter (spindle 7, 50 revs. per min)
5) MT carbon black (thermal carbon black)

These adhesives were used to produce bonds between steel (free cutting steel 9 S 20 K) and various rubber materials. The compositions and conditions of vulcanisation of the various types of rubber used are shown in table 2.

Table 2:

Vulcanisate I
100.0 parts by weight of natural rubber
20.0 parts by weight of zinc oxide
2.0 parts by weight of stearic acid
1.2 parts by weight of phenyl-β-naphthylamine
30.0 parts by weight of ISAF carbon black (furnace black)
1.0 parts by weight of 2-mercapto-benzothiazole
3.5 parts by weight of sulphur
vulcanisation: 35 minutes at 140°C Vulcanisate II
100.0 parts by weight of nitrile rubber (butadieneacrylonitrile compolymer, 33% acrylonitrile)
7.5 parts by weight of zinc oxide
0.5 parts by weight of stearic acid
40.0 parts by weight of SRF carbon black (furnace black)
1.0 parts by weight of colophony 2.0 parts by weight of methylene-bis- thioglycolic acid butyl ester
5.0 parts by weight of cumarone resin
0.8 parts by weight of benzothiazyl-2-diethyl sulphenamide
1.7 parts by weight of sulphur
vulcanisation: 35 minutes at 140°C Vulcanisate III
  100.0 parts by weight of styrene-butadiene rubber (styrene-butadiene copolymer containing 23.5 % of styrene)
  5.0 parts by weight of zinc oxide
  1.0 parts by weight of stearic acid
  60.0 parts by weight of HAF furnace black (carbon black)
  15.0 parts by weight of aromatic mineral oil plasticiser
  1.5 parts by weight of phenyl-$\beta$-naphthylamine
  1.4 parts by weight of benzothiazyl-2-cyclohexyl sulphenamide
  0.1 parts by weight of tetramethyl-thiuramic monosulphide
  1.8 parts by weight of sulphur
vulcanisation: 20 minutes at 150°C.

Test samples were prepared in accordance with ASTM D 429-68, method B. Metal strips which had been sand-blasted and degreased with trichloroethylene and strips of the vulcanisates which were to be bonded, which had been cleaned with trichloroethylene, were coated with a thin layer of the adhesives shown in table 1. After 3 hours' drying at room temperature, the coated metal strips and vulcanisate strips were placed together with the adhesive layers in contact and heated under light pressure at 140°C for 40 minutes. After 24 hours' storage at room temperature, the test samples were tested to determine the strength of the rubber/metal bonds by the peeling test according to ASTM test method D 429-68, method B, carried out at room temperature and at higher temperatures. The results obtained are summarised in table 3.

Table 3 also shows the strength of the bonds obtained when using a primer X of the following composition:

| chlorinated polyisoprene [1] | 10 parts by weight |
| Phenol formaldehyde resin [2] | 8 parts by weight |
| carbon black [3] | 2 parts by weight |
| methyl isobutyl ketone | 80 parts by weight |

[1] with a chlorine content of 67% and a viscosity of 160 cP (20% solution in toluene), determined at 20°C with a Brookfield LVF viscosimeter (spindle 1,30 revs. per min)
[2] unmodified, hardenable phenol formaldehyde condensation product (resol type) with a molar ratio of phenol to formaldehyde of 1:1.14, 60% solution in butanol with a viscosity of 3200 cP determined at 20°C with a Brookfield LVF viscosimeter (spindle 3, 30 revs. per min)
[3] MT carbon black (thermal black).

A thin layer of primer X was applied to the sand-blasted and degreased metal strips. After a drying time of 30 minutes, the adhesive shown in table 1 was applied to the metal strips which had been coated with primer and to the rubber vulcanisates. After a further 3 hours, test samples were prepared in accordance with ASTM D 429-68, method B, as already described.

For comparison Examples 13 and 14, adhesives prepared according to German Auslegeschrift 1,295,123 and having the following composition were used:

adhesive C
| ethylene-vinyl acetate copolymer[1] | 11 parts by weight |
| maleate resin[2] | 2 parts by weight |
| terpene phenol resin[3] | 2 parts by weight |
| methylene chloride | 35 parts by weight |
| toluene | 35 parts by weight |
| petroleum hydrocarbons bp$_{760mm}$:60-90°C | 15 parts by weight |

[1] with a vinyl acetate content of 45% and a melt index of 2 to 5 determined according to ASTM D 1238, condition E,
[2] with an acid number according to DIN 53 183 of 16 and a melting point according to DIN 53 181 of 130°C,
[3] with an acid number according to DIN 53 183 of 65 and a melting point according to DIN 53 181 of 140°C.

Table 3:

| Example | Vulcanisate | Adhesive | Primer | Bonding strength (kp/cm) 20°C | 80°C | 100°C | 120°C |
|---|---|---|---|---|---|---|---|
| 1 | I | A | - | 15.6*) | 4.8 | 2.6 | 1.2 |
| 2 | I | A | x | 20.4*) | 8.7 | 5.1 | 1.9 |
| 3 | II | A | - | 14.8*) | | | |
| 4 | II | A | x | 20.8*) | | | |
| 5 | III | A | - | 17.7*) | | | |
| 6 | III | A | x | 22.5*) | | | |
| 7 | I | B | - | 16.8*) | 6.0 | 3.5 | 1.9 |
| 8 | I | B | x | 21.5*) | 11.2 | 6.3 | 3.3 |
| 9 | II | B | - | 18.7*) | | | |
| 10 | II | B | x | 23.6*) | | | |
| 11 | III | B | - | 16.3*) | | | |
| 12 | III | B | x | 20.6*) | | | |
| 13 | I | C | - | 1.5 | | | |
| 14 | I | C | x | 2.5 | | | |

*) vulcanisate is torn out

We claim:
1. An adhesive composition consisting substantially of
  a. 0.5-30% by weight of a copolymer of ethylene and a vinyl ester having from 2 to 10 carbon atoms in the ester moiety, said vinyl ester being present in an amount of 35-70% by weight, based on the weight of said copolymer;
  b. 0.5-30% by weight of a member selected from the group consisting of chlorinated polyisoprene, chlorinated polyethylene, chlorinated polypropylene and chlorinated natural rubber, each of said members having a chlorine content of 60-70% by weight;
  c. 0.5-30% by weight of a compound of the formula

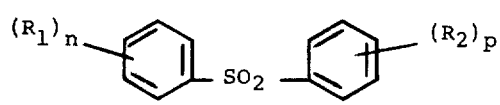

wherein $R_1$ and $R_2$ are each separately alkyl having 1 to 10 carbon atoms, alkoxy having 1 to 10 carbon atoms, cycloalkyl having 5 to 12 carbon atoms, phenyl, phenylalkyl having 7 to 13 carbon atoms, phenoxy or phenalkoxy having 7 to 12 carbon atoms; $n$ is zero or an integer of from 1 to 5 and $p$ is an integer of from 1 to 5;
  d. 0.1-24% by weight of a compound of the formula

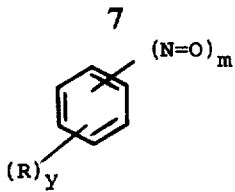

wherein R is alkyl having 1 to 10 carbon atoms, alkoxy having 1 to 10 carbon atoms, alkanolamino having 1 to 10 carbon atoms, cycloalkyl having 5 to 12 carbon atoms, phenylalkyl having 7 to 13 carbon atoms, phenyl, phenoxy, phenylamino having 6 to 12 carbon atoms, phenylnitrosoamino having 6 to 12 carbon atoms or halogen; y is zero or an integer of from 1 to 5 and m is 2 and e. 30–90% by weight of at least one organic solvent.

2. The adhesive composition of claim 1 wherein (c) is 4,4'-dimethyl diphenyl sulphone or a mixture thereof.

3. The adhesive composition of claim 1 wherein (d) is dinitrosobenzene.

4. The adhesive composition of claim 1 wherein (e) is at least one solvent selected from the group consisting of aromatic hydrocarbons, chlorinated hydrocarbons, ketones, carboxylic acid esters and alcohols.

5. The adhesive composition of claim 1 wherein (e) is xylene, toluene, benzene, trichloroethylene or perchloroethylene.

* * * * *